(12) United States Patent
Lee et al.

(10) Patent No.: US 9,215,129 B2
(45) Date of Patent: Dec. 15, 2015

(54) AUTOMATICALLY CONSTRUCTING PROTECTION SCOPE IN A VIRTUAL INFRASTRUCTURE

(71) Applicant: International Business Machines Corporation, Armonk, NY (US)

(72) Inventors: Cheng-Ta Lee, Taipei (TW); Jeffrey Lawrence Douglass, Fremont, CA (US); Deepti Sachdev, Cumming, GA (US)

(73) Assignee: International Business Machines Corporation, Armonk, NY (US)

( * ) Notice: Subject to any disclaimer, the term of this patent is extended or adjusted under 35 U.S.C. 154(b) by 418 days.

(21) Appl. No.: 13/860,864

(22) Filed: Apr. 11, 2013

(65) Prior Publication Data

US 2014/0310389 A1 Oct. 16, 2014

(51) Int. Cl.
 *G06F 3/00* (2006.01)
 *H04L 12/24* (2006.01)
 *G06F 9/455* (2006.01)

(52) U.S. Cl.
 CPC ............ *H04L 41/00* (2013.01); *G06F 9/45558* (2013.01); *G06F 2009/45595* (2013.01)

(58) Field of Classification Search
 USPC ................. 726/11, 23; 709/224, 250; 711/162
 See application file for complete search history.

(56) References Cited

U.S. PATENT DOCUMENTS

| | | | | |
|---|---|---|---|---|
| 8,244,855 | B1 * | 8/2012 | Walsh et al. .................. | 709/224 |
| 8,265,071 | B2 | 9/2012 | Sindhu et al. | |
| 8,291,499 | B2 | 10/2012 | Aziz et al. | |
| 8,756,337 | B1 * | 6/2014 | Canion et al. ................. | 709/238 |
| 2005/0281194 | A1 * | 12/2005 | Sonoda .......................... | 370/220 |
| 2006/0010299 | A1 * | 1/2006 | Zhang et al. .................. | 711/162 |
| 2008/0222309 | A1 * | 9/2008 | Shanbhogue .................. | 709/250 |
| 2011/0099631 | A1 * | 4/2011 | Willebeek-LeMair et al. . | 726/23 |
| 2011/0173490 | A1 * | 7/2011 | Narayanaswamy et al. . | 714/4.11 |
| 2011/0292939 | A1 * | 12/2011 | Subramaian et al. ......... | 370/392 |
| 2011/0299413 | A1 * | 12/2011 | Chatwani et al. ............. | 370/252 |
| 2013/0036470 | A1 | 2/2013 | Zhu et al. | |
| 2013/0182625 | A1 * | 7/2013 | Kuehnel et al. ............... | 370/311 |

OTHER PUBLICATIONS

IBM, "IBM Security Virtual Server Protection for VMware," Data Sheet, Apr. 2012, available at: http://public.dhe.ibm.com/common/ssi/ecm/en/wgd03008usen/WGD03008USEN.PDF.
IBM, "Installation Guide for Virtual Server Protection for VMware," Mar. 2012, available at: http://pic.dhe.ibm.com/infocenter/sprotect/v2r8m0/topic/com.ibm.pvm.doc_1.0/VSP_Install_Guide_1_1_0_1.pdf.

* cited by examiner

*Primary Examiner* — Joseph P Hirl
*Assistant Examiner* — Sayed Beheshti Shirazi
(74) *Attorney, Agent, or Firm* — Jeffrey S. LaBaw; David H. Judson

(57) ABSTRACT

An automated technique for constructing and updating protection scope is described. Preferably, the protection scope is MAC-address based. According to this technique, one or more packet processing units (PPUs) execute a MAC address learning algorithm to gather a list of MAC addresses. Packet processing units typically are one of: a kernel module residing on the hypervisor, a virtual appliance running a packet processing engine, and a software agent running on a virtual machine and that processes packet flows between and among associated virtual machines. Each of the one or more PPUs is provisioned to collect a set of MAC addresses; the PPUs exchange their lists, and the lists are then merged into a merged list from which a current protection scope is then generated. Each entry in the protection scope preferably contains information indicating which PPU is available to protect the MAC address associated with that entry.

19 Claims, 7 Drawing Sheets

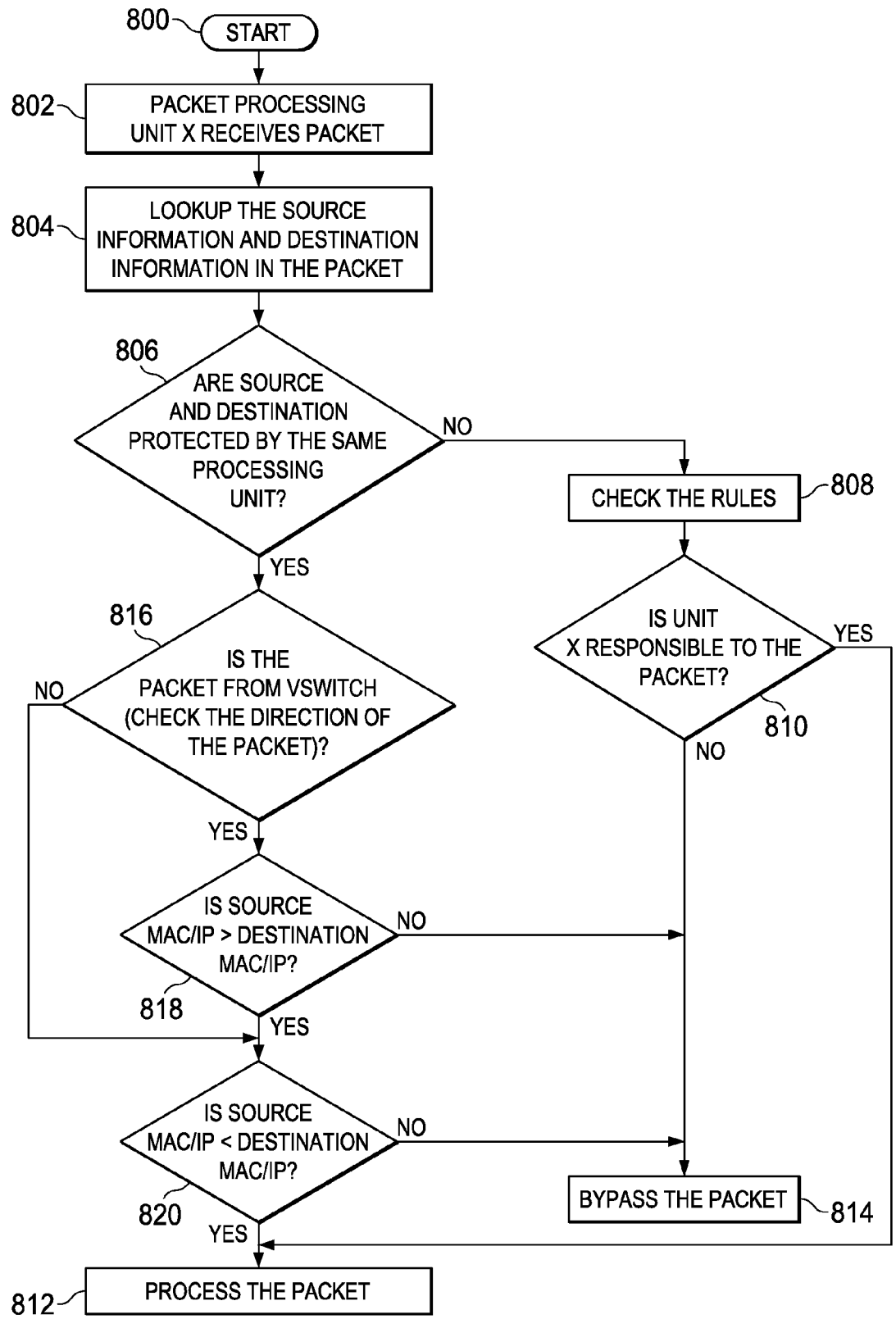

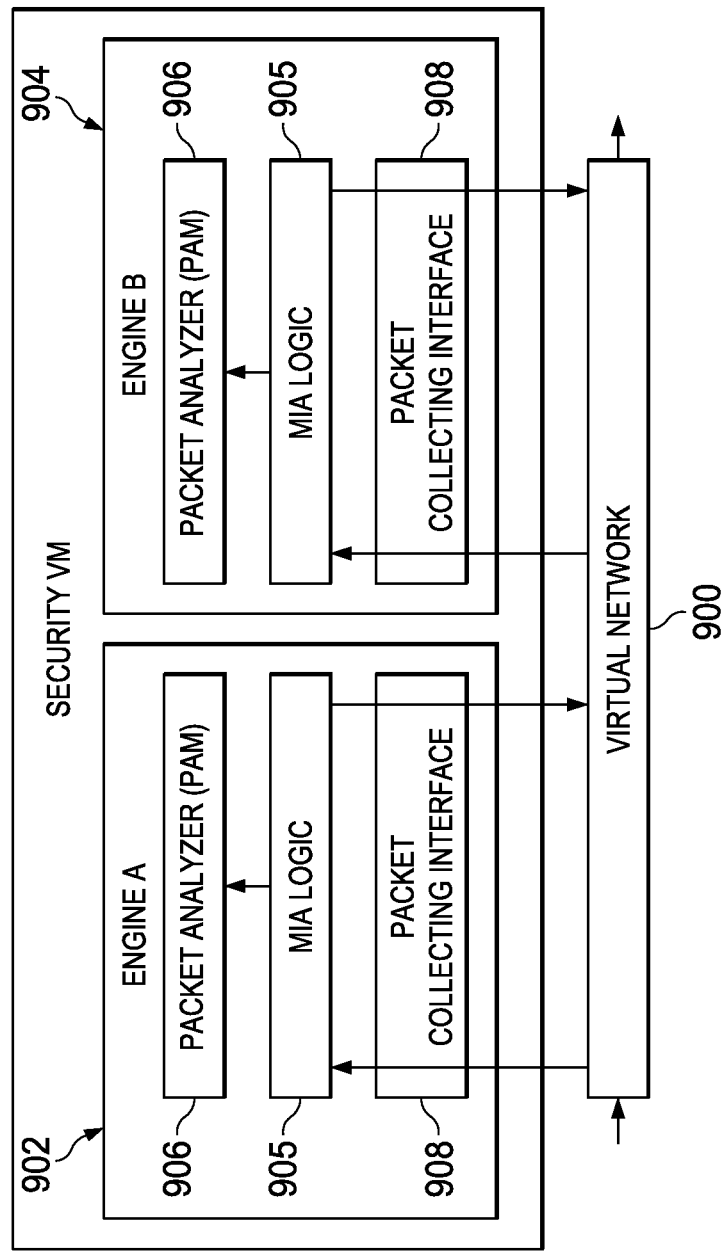

AUTOMATICALLY CONSTRUCTING PROTECTION SCOPE IN A VIRTUAL INFRASTRUCTURE

BACKGROUND OF THE INVENTION

1. Technical Field

This disclosure relates generally to protecting resources in a virtualized networking environment.

2. Background of the Related Art

An emerging information technology (IT) delivery model is cloud computing, by which shared resources, software and information are provided over the Internet to computers and other devices on-demand. Cloud computing can significantly reduce IT costs and complexities while improving workload optimization and service delivery. With this approach, an application instance can be hosted and made available from Internet-based resources that are accessible through a conventional Web browser over HTTP. An example application might be one that provides a common set of messaging functions, such as email, calendaring, contact management, and instant messaging. A user would then access the service directly over the Internet. Using this service, an enterprise would place its email, calendar and/or collaboration infrastructure in the cloud, and an end user would use an appropriate client to access his or her email, or perform a calendar operation.

Cloud compute resources are typically housed in large server farms that run networked applications, typically using a virtualized architecture wherein applications run inside virtual servers, or so-called "virtual machines" (VMs), that are mapped onto physical servers in a data center facility. The virtual machines typically run on top of a hypervisor, which is a control program that allocates physical resources to the virtual machines.

Virtualization offers significant benefits to the IT organization, but existing security solutions are not optimized to work in the virtual environment. Traditional security processes and technologies cannot effectively protect the additional layers, including the hypervisor, management stack and virtual network. As a result, virtualized servers may be less secure than the physical servers they replace, leaving organizations at risk of malicious attacks and failure to meet compliance mandates. To address these issues, it is known in the prior art to provide virtual server protection technologies, such as IBM® Security Virtual Server Protection for VMware®, to provide an integrated threat mitigation solution designed to enable organizations to exploit fully the benefits of server virtualization while protecting critical virtualized assets. Such technologies provide a set of security features, such as transparent intrusion protection service (IPS), VM automatic discovery, VM rootkit detection, inter-VM traffic analysis, virtual network access control, virtual infrastructure auditing, virtual patching, and the like.

To provide network security in virtualization environment, there is a need to inspect traffic on the virtual network. There are many ways of inspecting the traffic between virtual machines, including using the interface provided by the hypervisor to extract packets from each VM directly, redirecting the traffic to a virtual appliance running separate packet processing services, and installing and executing an agent on each VM dedicated to this function. Regardless of which approach is used, it is desirable to avoid inspecting the same packet multiple times, as doing so may confuse the security module and/or itself trigger some security event. This "multiple inspection avoidance" (MIA) problem is known, and virtual server protection technologies such as described above may include configuration options to address them.

The concept of "protection scope" refers to a list of Internet Protocol (IP) addresses of every VM running on a hypervisor in a virtual network environment. IP addresses typically are in a known format, such as single IP address, IP address range, and IP in CIDR block notation. To ensure adequate security, IT or cloud administrators have a need to construct the protection scope associated with a hypervisor or other cloud resource to enable virtual server or network protection technologies (such as transparent IPS) to know which VM should be protected. Moreover, the IPS service needs to understand protection scope to provide other types of services, such as multiple inspection avoidance (MIA).

Typically, administrators use manual techniques to collect and manage the protection scope. This has proved challenging due for several reasons. First, due to the use of P2V (physical-to-virtual) technologies, it has become very easy to convert a physical machine to a virtual machine. Such VMs, however, may be added from different departments or locations, and thus the administrator (to maintain the accuracy of the protection scope) is forced to specify IP addresses one by one, which is difficult to do consistently. Another problem is that new VMs often come on-line (or are started from inventory) dynamically, thus requiring the protection scope to be modified continuously to ensure it is correct for a current network configuration. Another problem is that IP addresses associated with a VM can be circumvented (e.g., by sending a packet with a fake IP address to bypass inspection).

If the protection scope is not accurate, some traffic is not inspected correctly and thus some of the VMs will not be protected. Moreover, if the protection scope is malformed or otherwise stale, there may be security breaches in the environment.

BRIEF SUMMARY

According to this disclosure, an automated technique for constructing and updating protection scope is described. Preferably, the protection scope is MAC-address based. According to this technique, one or more packet processing units (PPUs) execute a MAC address learning algorithm to gather a list of MAC addresses. Packet processing units typically are one of: a kernel module residing on the hypervisor, a virtual appliance running a packet processing engine, and a software agent running on a virtual machine and that processes packet flows between and among associated virtual machines. Each of the one or more PPUs is provisioned to collect a set of MAC addresses; the PPUs exchange their lists, and the lists are then merged into a merged list from which a current protection scope is then generated. The current protection scope is then provided to each PPU. Each entry in the protection scope preferably contains information indicating which PPU is available to protect the MAC address associated with that entry.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which:

FIG. 8 illustrates a process flow describing how to implement a multiple inspection avoidance (MIA) scheme using the MAC-based protection scope that has been automatically constructed according to this disclosure; and FIG. 9 illustrates the multiple inspection avoidance technique of this disclosure.

DETAILED DESCRIPTION OF AN ILLUSTRATIVE EMBODIMENT

Figure 1:
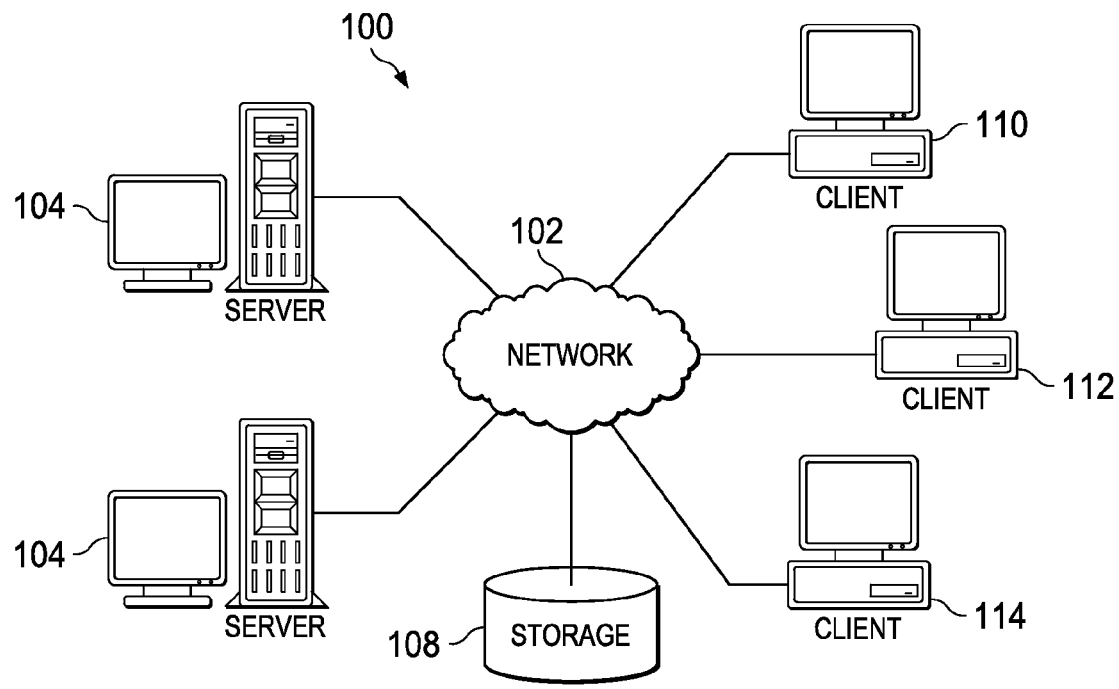
FIG. 1 depicts an exemplary block diagram of a distributed data processing environment in which exemplary aspects of the illustrative embodiments may be implemented.
Figure 2:
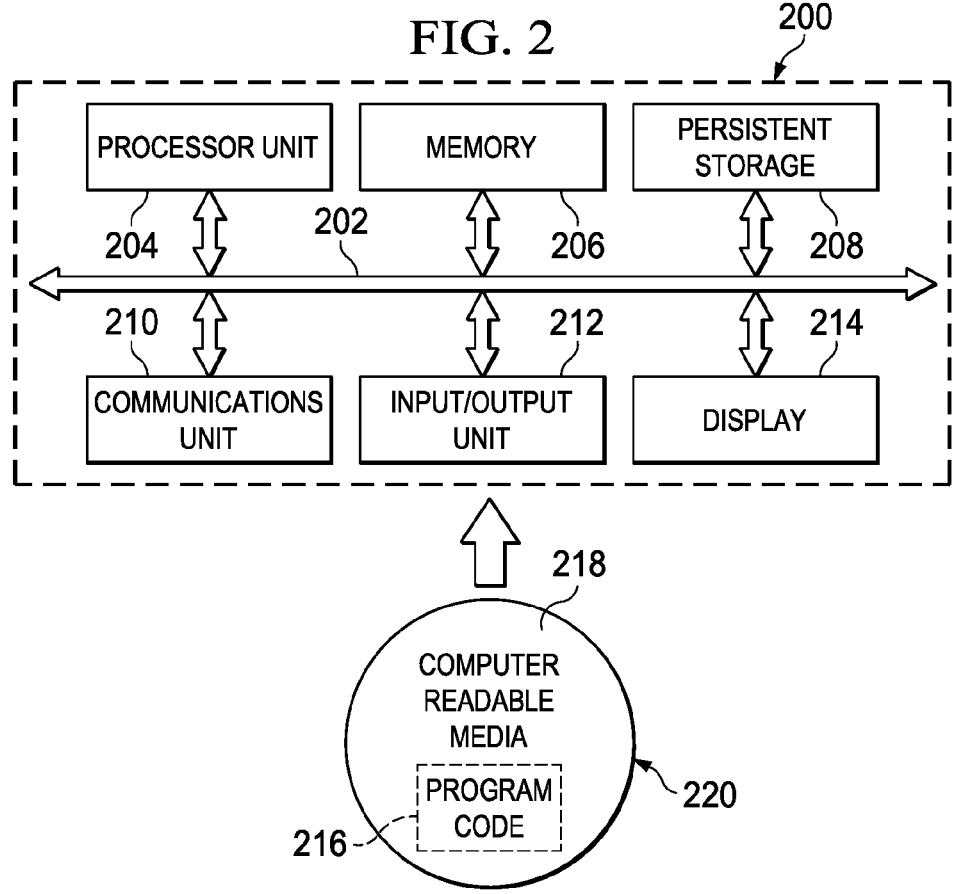
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.
Client-Server Technologies With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse.

Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++, C#, Objective-C, or the like, and conventional procedural programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

The techniques described herein may operate in conjunction within the standard client-server paradigm such as illustrated in FIG. 1 in which client machines communicate with an Internet-accessible cloud-based portal or application executing on a set of one or more machines. End users operate Internet-connectable devices (e.g., desktop computers, notebook computers, Internet-enabled mobile devices, or the like) that are capable of accessing and interacting with the portal or application. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

By way of additional background, virtualization techniques enable the configuration of physical resources. One such virtualization technique is "logical partitioning." Logical partitioning is the ability to make a server run as if it were two or more independent servers. When a server is logically partitioned, the resources on the server are divided into subsets called logical partitions. Software may be installed on a logical partition, and the logical partition runs as an independent logical server with the resources that are allocated to the logical partition. Processors, memory, and input/output (I/O) devices can be assigned to logical partitions. I/O devices include network adapters.

With virtual adapters, logical partitions can be connected with each other without using physical hardware. Operating systems can display, configure, and use virtual adapters just like they can display, configure, and use physical adapters. Depending on the operating environment used by the logical partition, virtual Ethernet adapters, virtual Fibre Channel adapters, virtual Small Computer Serial Interface (SCSI)

adapters, and virtual serial adapters for a logical partition can be created and managed. Similarly, the Ethernet adapters are visible in the same way as physical Ethernet adapters. By default, virtual Ethernet Media Access Control (MAC) addresses are created from the locally administered range. Using the default MAC addresses, it is possible that different servers will have virtual Ethernet adapters with the same addresses.

Virtual Ethernet allows logical partitions to communicate with each other without having to assign physical hardware to the logical partitions. Virtual Ethernet adapters can be created on each logical partition and connected to virtual LANs. TCP/IP communications over these virtual LANs is routed through the server firmware. A logical partition can use virtual Ethernet adapters to establish multiple high-speed inter-partition connections within a single managed system. Logical partitions can communicate with each other using TCP/IP over the virtual Ethernet communications ports. Virtual Ethernet adapters are connected to an IEEE 802.1q (VLAN)-style virtual Ethernet switch. Using this switch function, logical partitions can communicate with each other by using virtual Ethernet adapters and assigning VLAN IDs that enable them to share a common logical network. The virtual Ethernet adapters are created and the VLAN ID assignments typically are done using a hardware management console. When configured, the system transmits packets by copying the packet directly from the memory of the sender logical partition to the receive buffers of the receiver logical partition, preferably without any intermediate buffering of the packet. An Ethernet bridge may be configured between the virtual LAN and a physical Ethernet adapter that is owned by a virtual server or a logical partition. The logical partitions on the virtual LAN can communicate with an external Ethernet network through the Ethernet bridge.

Virtualized Network Environments

Figure 3:
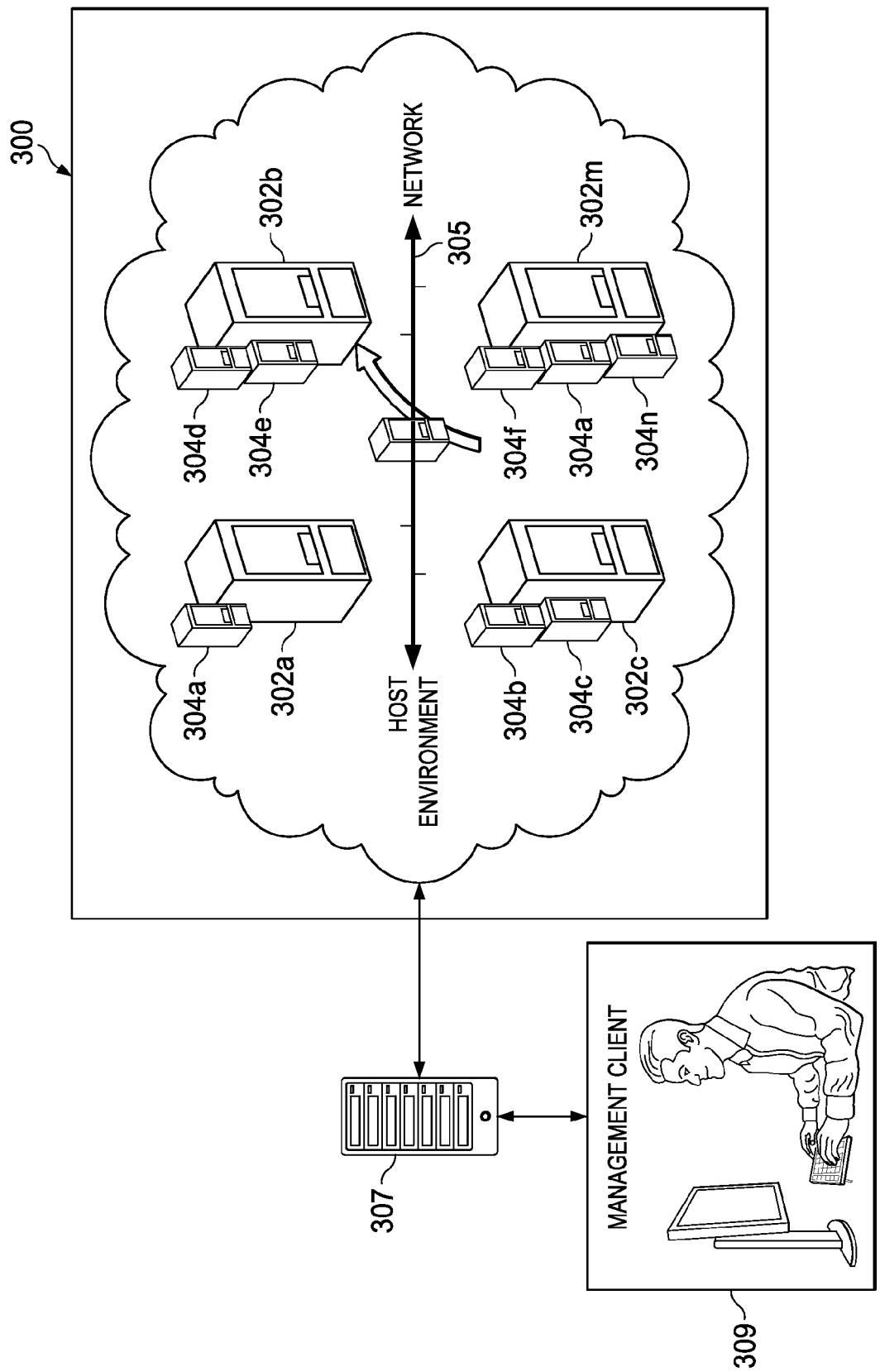
FIG. 3 illustrates an exemplary virtual networking environment.

In FIG. 3, an example virtual machine hosting environment 300 (sometimes referred to herein as a data center or "cloud") is illustrated. This environment comprises host machines (HM) (e.g., servers or like physical machine computing devices) connected via a network 305 and a management server 307. As shown in FIG. 3, physical servers 302a . . . 302m, are each adapted to dynamically provide one or more virtual machines (VM$_1$ . . . VM$_n$ denoted as 304a through 304n, respectively) using virtualization technology. Such technology is available commercially, e.g., from VMware® or others. Server virtualization is a technique that is well-known in the art. As depicted, multiple VMs can be placed into a single host machine and share the host machine's CPU, memory and other resources, thereby increasing the utilization of an organization's data center. The management server 307 may be connected to a client console 309, or to a global management system that manages larger-scale infrastructure (if the data center is being managed with other data centers). The management server 307 monitors the infrastructure and automatically manipulates the VM placement as needed, e.g., by moving virtual machines between hosts, suspending/resuming virtual machines, and the like.

Figure 4:
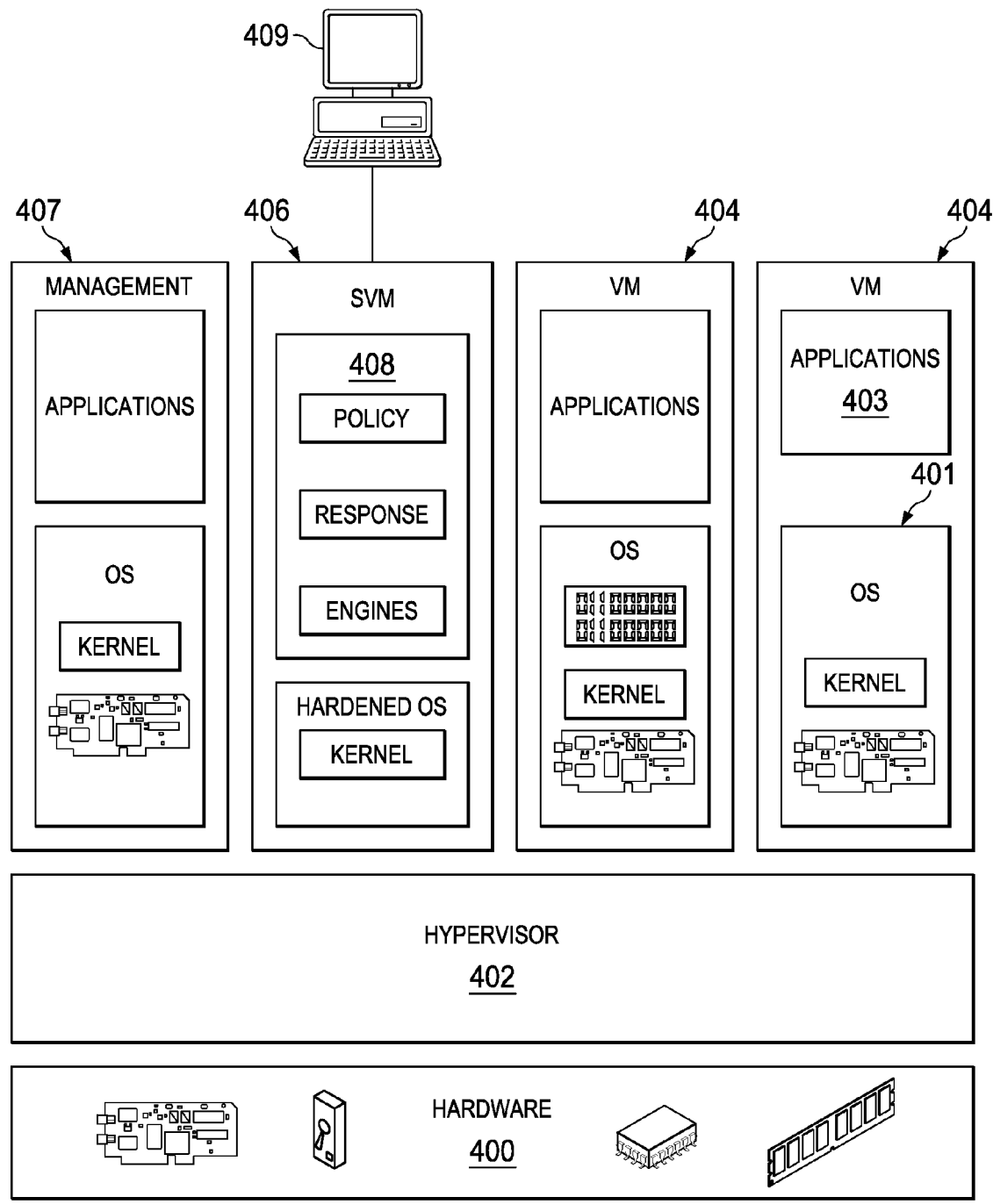
FIG. 4 illustrates how the environment of FIG. 3 may be enhanced using virtual server protection technologies.

FIG. 4 illustrates how virtual server protection technologies can be used to provide a threat mitigation solution for a virtualized environment. In this scenario, there is a hardware layer 400 (that includes the physical machines and resources), a hypervisor 402, and individual virtual machines 404. The virtual machines 404 run on virtual networking technologies, such as VMware ESX/ESXi. An operating system 401, one or more applications 403, and other virtual resources (not shown), may be associated with a virtual machine 404. One of the virtual machines may be configured as a management server 407, and the system typically includes a client console 409 (both as described above). Representative platform technologies are, without limitation, IBM System x® servers with VMware vSphere 4.1 Update 1 and 5.0. In this environment, there is a special virtual machine, called a security virtual machine (SVM) 406, that hosts a virtual server protection agent 408 that provides, among other things, intrusion prevention, firewall, and rootkit protection for the other virtual machines. The SVM 406 exists as a privileged VM, and it is installed on the same physical host as the virtual hosts it protects (although preferably it remains external to those protected hosts). The SVM operates to block network-based attacks on the virtual machines 404 by inspecting and analyzing network traffic to, from, and between virtual hosts, in real time. Thus, for example, the firewall can provide policy enforcement for network communication on the external physical network and on all inter-virtual machine traffic. The SVM also provides rootkit protection by using introspection, which is the ability to inspect the memory of a virtual machine.

The SVM may include an accelerator function that enhances the performance of the SVM by analyzing traffic between one physical NIC (pNIC) on an "accelerate" virtual switch and one other virtual switch already configured on the virtual network. When this function is enabled, the SVM configures the virtual network to allow the agent to directly capture and monitor traffic on one external pNIC using a new virtual switch. A network interface of the SVM is attached to the virtual switch.

More generally, the SVM is a specialized type of packet processing unit (PPU). A PPU is sometimes referred to herein as a packet (or "deep packet") inspection engine. Packet inspection of this type is a form of computer network packet filtering that examines the data part (and possible the header) of a packet as it passes an inspective point, searching for protocol non-compliance, virus, spam, intrusions, or other defined criteria to decide whether the packet may be passed. An engine of this type typically is implemented in software; it acquires packets using known techniques, such as port mirroring, interception, virtual port mirroring, and the like. Other types of PPUs may also be implemented in the virtual environment. They include, for example, a kernel module residing on the hypervisor, a virtual appliance running a packet processing engine, or the like.

The SVM has various configuration options, including an option to configure the device for inter-VM traffic analysis and MIA.

Automatically Constructing Protection Scope in a Virtual Infrastructure

With the above as background, the subject matter of this disclosure is now described. Without limitation, the subject matter may be implemented within or in association with a virtual network environment as has been described above.

A protection scope is sometimes referred to herein as a protection domain.

Figure 5:
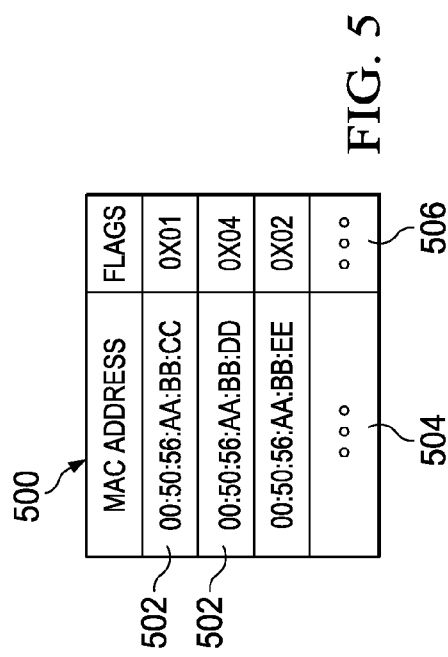
FIG. 5 illustrates a representative MAC-based protection scope according to this disclosure.

As illustrated in FIG. 5, an exemplary protection scope (sometimes referred to as a protection domain) 500 is a list of protection entries 502, with each protection entry 502 corresponding to a row of a table. Although a table structure is shown in FIG. 5 for convenience, this is not a limitation, as the protection scope may comprise a linear array, a b-tree, a hash table, a linked list, or some other data structure to store the data comprising a particular entry. Preferably, each entry comprises at least two (2) data fields, corresponding to the columns in the table in FIG. 5. These data fields are an address field, 504, and a flag field 506. The address field preferably is media access control (MAC) address-based. This address field 504 records the MAC address of the virtual machine (VM) that should be protected. The flag field 506 indicates which packet processing unit (PPU) is responsible to that address. The flags may be one of: a bitmask, a user-defined identifier (ID), a string value, or the like. As will be described, a PPU uses the address field 504 to check if a given address is within the protection scope.

Each packet has two (2) addresses associated with the packet, namely: a source address, and a destination address. In a preferred embodiment, the addresses are MAC addresses. In the alternative, IP addresses, or IP address/ports, or some combination of MAC address and IP address, may be used. In particular, each packet either is sent or received by a virtual adapter, such as a virtual Ethernet adapter, as described above. Given that information, it is possible to detect the correct MAC address for the packet. Thus, for example, one way to do this is to extract (from the packet) one of the MAC addresses that is relevant to the local adapter. For example, if an adapter is sending a packet, its "source MAC address" can be extracted; likewise, if an adapter is receiving a packet, its "destination MAC address" can be extracted. For each adapter, this information is then stored in a list, together with directional information (send or receive) for the packet. After several packets have been sent and received, the resulting data is examined. Based on that examination, if an entry has both flags (send and receive), then it can be assumed that the MAC addresses associated with the adapter have been found.

The learning algorithm may also account for changing addresses as follows. In particular, after an address has been learned, every packet after that shall have the appropriate address compared to the learned address. If it is different, then the address shall be placed in the per-adapter list and the relevant flag (sent or received) set. If that entry has both flags set, the new address is immediately learned and the old address will have the flags cleared.

Although not illustrated, and as noted above, the protection list may use IP addresses in lieu of (or in addition to) MAC addresses. In such case, the address field 504 in each entry of the list 500 would be an IP address, an IP address range, an IP address represented in CIDR block notation, or the like.

According to this disclosure, the following describes a MAC list exchange protocol (sometimes referred to herein as a "learning algorithm") that is implemented by a set of packet processing units (PPUs) to automate the process of building the protection scope. Typically, each PPU in the virtual environment operates a packet examination technique such as described above. As a result of executing this examination routine, the PPU builds a list of its protection scope. One such list is shown in FIG. 5. Periodically, or upon a given occurrence, the PPUs execute an automated routine to build a protection scope that represents a "merged" view of the individual protection lists created at each PPU. The protection scope that results from this "merger" of the PPU-specific protection lists is sometimes referred to as a "merged" protection scope, or a "master" protection scope.

Figure 6:
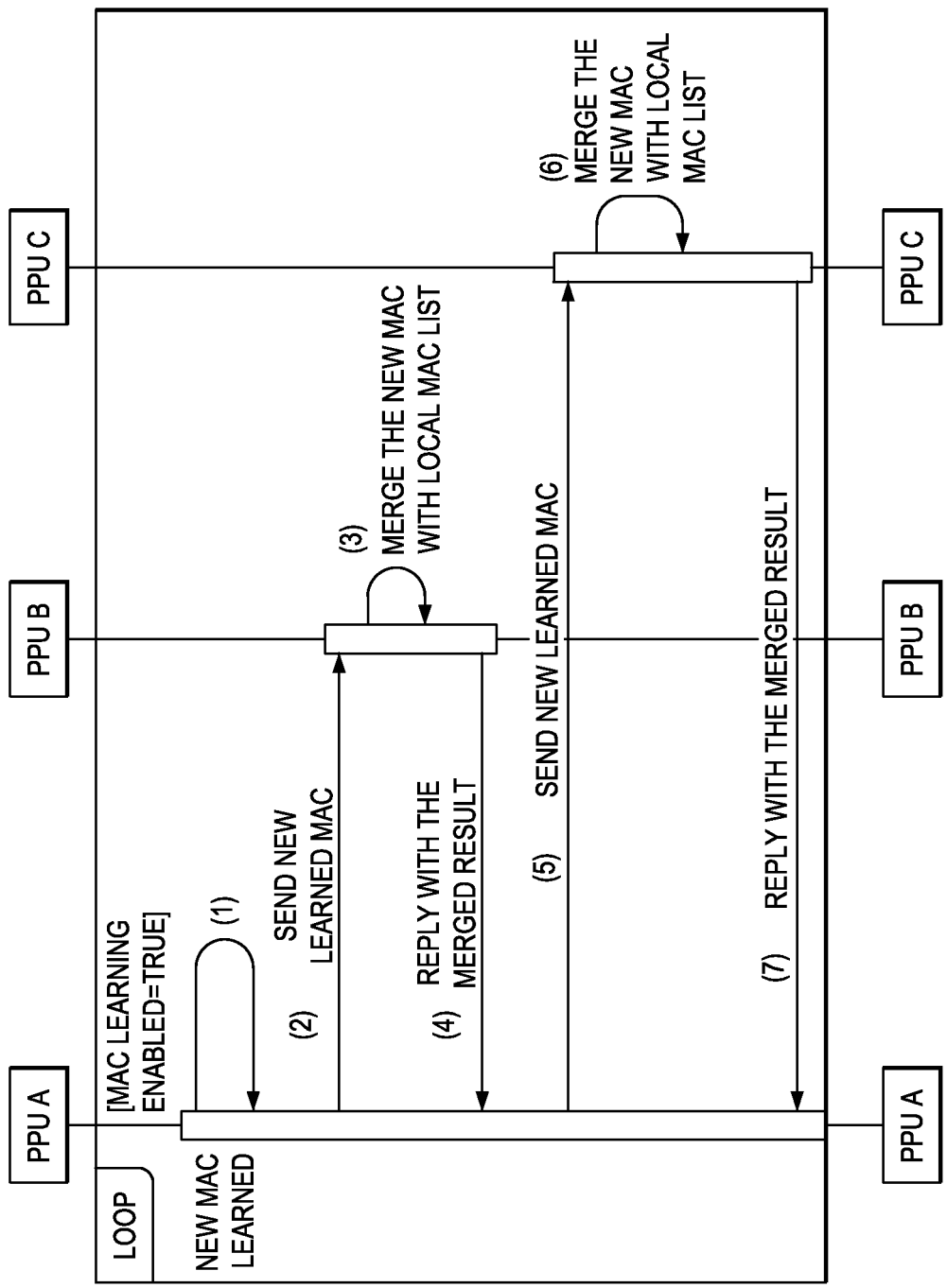
FIG. 6 illustrates a technique for automatically constructing a protection scope according to this disclosure.

FIG. 6 illustrates a sequence diagram of a MAC list exchange and merger protocol according to this disclosure. In this example scenario, there are three (3) packet processing units: PPU A, PPU B and PPU C. This is not a limitation, as any number of PPUs may implement the protocol. Also, the protocol may be implemented in phases, or across a subset of the PPUs, as appropriate, depending on implementation (e.g., processing, communication, storage, etc.) requirements. In this example, PPU A operates as a master PPU (sometimes referred to as a "leader"). MAC learning is presumed to be enabled at each PPU. At step (1), a new MAC list is learned at PPU A. At step (2), the new learned MAC list is communicated from PPU A to PPU B. PPU B then merges the new MAC list (obtained from PPU A) with its own local MAC list. This is step (3). At step (4), PPU B replies back to PPU A with a merged result (representing the merger of the lists from PPU A and PPU B). At step (5), PPU A takes the result (the merger of lists from PPU A and PPU B) obtained from PPU B and forwards it to PPU C. PPU C then takes this list and merges it with its own local MAC list. This is step (6). At step (7), PPU returns to PPU A a final merged (or "master") list.

Upon creation of the merged list, that list is then provided (in this case, from PPU A) to each of the other PPUs that participate in the exchange protocol so that the newly-created aggregate list may then be enforced "locally" on that PPU.

This sequential approach (of exchanging lists) is merely representative of one technique that may be used to create the master MAC list. In this example, as described, PPU A serves as the master or leader and acts to aggregate the full MAC list from the other PPUs by having each of the other PPUs perform some portion of the merger operation. In an alternative, PPU A can simply request that each of the other PPUs provide their local lists to PPU A, at which point PPU A can create the aggregate list itself. Still other approaches to building the master list may be used, such as using a shared memory between or among participating PPUs to construct the master MAC list, use of distributed agreement algorithms or other knowledge-based exchange protocols, or the like.

Preferably, the learning algorithm as described above is carried out autonomously and continuously (or at least periodically) so that the aggregate list remains current. The aggregate list, with or without additional information (e.g., statistical data or other information), is then assigned as the current protection scope.

As the MAC lists are propagated (from the leader to the other participating PPUs), there may be brief periods during which the PPUs are not synchronized, but these periods preferably are short and do not reduce the value of the overall method.

Further, any known algorithm may be used by the PPUs to select a PPU that acts as the master. A representative algorithm is a leader election algorithm.

Figure 7:
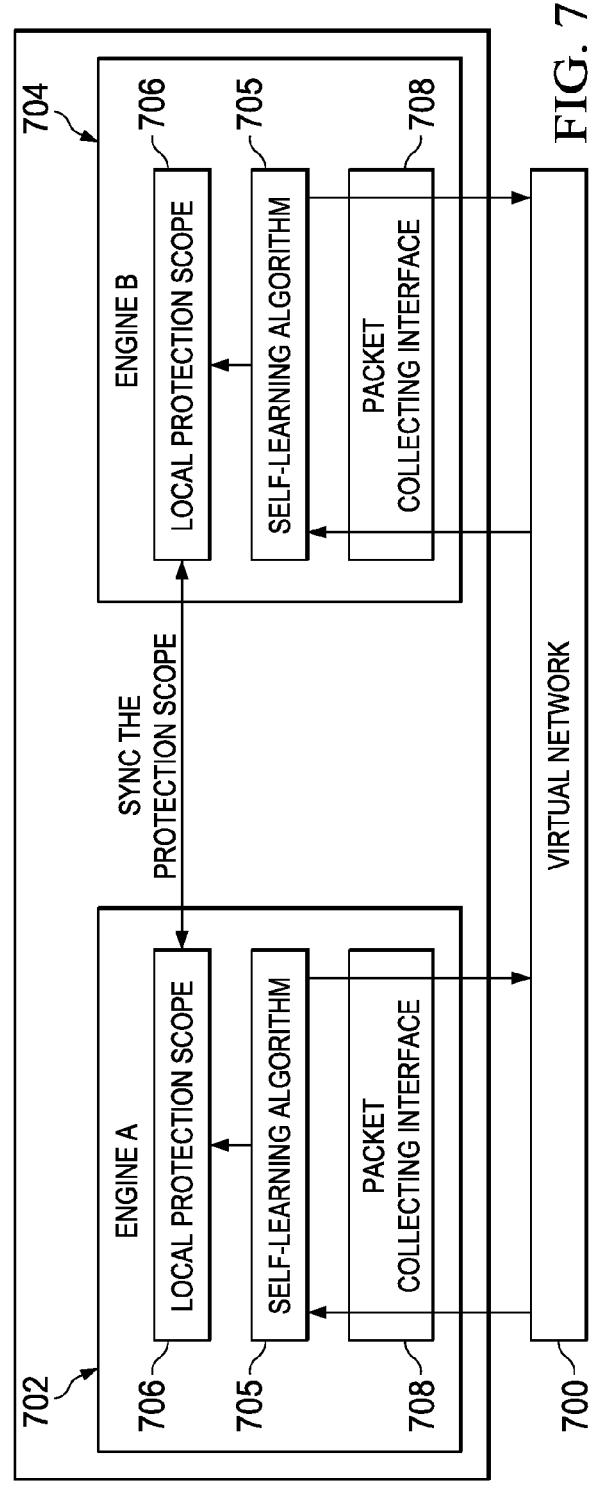
FIG. 7 illustrates how a set of packet inspection engines cooperate using the packet exchange protocol of this disclosure to populate the protection scope.

FIG. 7 illustrates how a pair of first and second packet inspection engines 702 and 704 associated with a virtual network 700 cooperate using the packet exchange protocol of this disclosure to populate the protection scope. When an engine receives a packet via its packet collecting interface 708, the packet goes through the self-learning algorithm 705. If as a result the engine learns a new address (MAC, or IP), it updates its local protection scope 706. As illustrated in FIG. 7, each of the engines has a local protection scope 706, and the local scopes are synchronized in the manner described, preferably by generating the aggregate version, which is then shared among the cooperating engines. In this example, the engines are each an SVM, although these engines need not reside on the same virtual machine.

Multiple Inspection Avoidance (MIA) Using a Protection Scope

FIG. 8 illustrates a process flow for an enhanced multiple avoidance inspection (MIA) technique according to this disclosure. In a preferred embodiment, the MIA technique uses an MIA-based protection scope that has been determined in the automated manner described above. This is not a limitation, however, as the MIA technique herein may be implemented using an IP address based (or a mixed IP and MAC address-based) protection scope, and/or using a protection scope that is generated in other than the automated manner described. As will be seen, the MIA technique ensures that the same packet is not inspected more than once by a same packet processing unit (PPU), and that the same packet is not inspected more than once by different PPUs. According to this disclosure, when a PPU implementing MIA receives a packet, it uses the protection scope to determine whether it needs to process the packet. Preferably, the determination of whether to process the packet depends on the source and destination addresses in the packet, whether those addresses are being protected by the PPU that receives the packet, the direction of the packet flow, and optionally one or more packet processing rules.

A preferred MIA logic is implemented according to the process flow shown in FIG. 8. The routine is implemented in a PPU (referred to as "Unit X" in this example). Typically, the routine is implemented as computer software executing on a virtual server or other virtualized resource, which is turn execute on one or more physical elements. The routine assumes the existence of a protection scope. It begins at step 800. A step 802, the PPU Unit X receives a packet. At step 804, the routine examines the packet to identify its source and destination addresses. A test is then performed at step 806 to determine if the source and destination addresses are being protected by Unit X. If the outcome of the test at step 806 is negative, the routine continues at step 808 to check one or more processing rules. A processing rule may indicate that Unit X is still responsible for processing the packet even though the source and destination addresses are not being protected by the PPU. Based on applicability of the one or more rules, processing may then continue at step 810, wherein a test is performed to determine if Unit X is otherwise responsible for the packet. If the outcome of the test at step 810 indicates that Unit X is responsible for the packet, processing continues at step 812 with Unix X processing the packet in the usual manner. If, however, the outcome of the test at step 810 indicates that Unit X is not responsible for the packet, the routine branches to step 814. At this point, Unit X bypasses the packet, since it is not responsible for its processing.

If the outcome of the test at step 806 indicates that the source and destination are protected by Unit X, the routine branches to step 816. At this step, the direction of the packet is used to determine if the packet originates from a virtual switch (vswitch). If the result of the test at step 816 is positive, control then branches to step 818. At this step, a test is performed to determine whether the source address (e.g., the MAC, the IP, the combined MAC and IP) is greater than the corresponding destination address (whatever the format being used). If the outcome of the test at step 818 is positive, control continues at step 814 and the packet is bypassed. If, however, the outcome of the test at step 818 is negative, control continues at step 812 and the PPU processes the packet.

Finally, if the outcome of the test at step 816 is negative (indicating that the packet is not from the vswitch), the routine continues at step 820. At this step, a test is performed to determine whether the source address is less than the corresponding destination address. If the outcome of the test at step 820 is negative, control continues at step 814 and the packet is bypassed. If, however, the outcome of the test at step 820 is positive, control continues at step 812 and the PPU processes the packet.

Thus, according to the above-described technique, when the PPU receives a packet, the routine checks which unit is responsible for the packet's source and destination. Depending on the protection source, the packet's MAC addresses or IP addresses, or some combination thereof, are evaluated to perform this check (step 804). This information is then used to determine how to process the packet. If the packet source and destination belong to the same PPU and that is also processing the packet, the source information is compared with the destination information to make the processing decision. Preferably, the PPU only processes the packet in this scenario if it responsible for the smaller of the source and destination addresses. As a result of executing this technique, if the same PPU unit receives the packet twice but from a different direction, the packet is only inspected once. In contrast, if packet source and destination do not belong to the same PPU, one or more rules (step 808) are then followed to make the decision; in this scenario, the rules are configured to ensure that one and only one unit processes the packet.

The MIA technique described above ensures that MIA can be implemented appropriately in the virtual environment even when multiple packet inspection engines are implemented. FIG. 9 illustrates this operation. In this example, there are two packet processing engines 902 and 904 associated with the virtual network 900. In this scenario, the engines are associated with an SVM, but this is not required. When an engine receives a packet, the packet is first checked by the MIA logic 905. If the MIA logic 905 decides to inspect the packet, then the packet is sent to the associated packet analyzer 906. If the MIA logic 905 decides not to inspect the packet, the MIA logic just bypasses the packet. As a result of executing the MIA logic as described, only one packet analyzer 906 does the actual inspection of the packet. In this embodiment, the packet collecting interface 908 may be a normal NIC or a special API provided by the hypervisor. Moreover, the MIA logic may also reside in the packet collecting interface directly or even be part of the virtual network (at the hypervisor level).

The above-described subject matter provides many advantages.

The main advantage of this technique is that it operates in an automated and autonomous manner such that a protection scope can be created and updated much more efficiently and reliably as compared to prior techniques, which are effectively manual. As noted above, the prior art techniques are subject to configuration errors, maintenance difficulties, IP address spoofing, and other problems. Using the automated technique herein, the protection scope is updated periodically, continuously or otherwise as needed (or on demand). Further, by using MAC addresses instead of IP addresses to generate the protection scope, the PPU can operate more efficiently and reliably. This is because, as compared to IP addresses, it is much more difficult to fake a MAC address (in part because receiving a packet with an incorrect (fake) MAC address is not possible unless the virtual switch cooperates). In addition, virtual switches (when configured as PPUs, as described herein) can readily detect forged MAC addresses and drop those packets. If the host administrator has configured the host very securely, then it is impossible for a guest VM to change its MAC or receive any packets with a MAC that is different than the one that the administrator assigned.

The approach described herein enables the creation and maintenance of accurate protection scope. Thus, virtual network traffic is inspected correctly and the VMs protected appropriately. The technique further avoids the problems associated with malformed or stale protection scopes.

As has been described, the functionality described above may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

Still more generally, the subject matter described herein can take the form of an entirely hardware embodiment, an entirely software embodiment or an embodiment containing both hardware and software elements. In a preferred embodiment, the trusted platform module function is implemented in software, which includes but is not limited to firmware, resident software, microcode, and the like. Furthermore, the download and delete interfaces and functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible, non-transitory item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the interfaces and backup and restore utility are implemented in a special purpose computing platform, preferably in software executed by one or more processors. The software is maintained in one or more data stores or memories associated with the one or more processors, and the software may be implemented as one or more computer programs. Collectively, this special-purpose hardware and software comprises the functionality described above.

In the preferred embodiment, the functionality provided herein is implemented as an adjunct or extension to an existing cloud compute management solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The reference to "packet protection unit" or PPU should not be taken to limit the disclosed subject matter to any particular type or source of packet inspection technology or software. The term is intended to refer generically to packet inspection functionality, which need not be a stand-alone product or set of code.

Having described our invention, what we now claim is as follows.

The invention claimed is:

1. A method of constructing and using a protection scope for a virtual network, comprising:
  generating a set of data structures, each such data structure having one or more entries, wherein each entry includes an address of a virtual resource in the virtual network that is to be protected, together with a reference to a packet inspection unit that is responsible to inspect packets associated with the virtual resource, each data structure generated in association with a packet inspection unit;
  aggregating information from at least first and second of the data structures to generate an aggregate data structure, the aggregate data structure representing a current protection scope for the virtual network;
  providing the aggregate data structure to each packet inspection unit;
  at a given one of the packet inspection units, receiving a data packet, the data packet including source and destination address information;
  determining, using the current protection scope and the source and destination address information, whether to inspect the data packet by the packet inspection engine; and
  based on the determination, taking a given action, the given action being one of: inspecting the data packet by the packet inspection engine, and bypassing inspection of the data packet.

2. The method as described in claim 1 wherein the address of a virtual resource in the virtual network is a media access control (MAC) address.

3. The method as described in claim 1 wherein the information from at least first and second data structures is aggregated using an exchange protocol.

4. The method as described in claim 1 wherein the exchange protocol includes:
  receiving the first data structure; and
  merging the first data structure with the second data structure to create the aggregate data structure.

5. The method as described in claim 1 wherein a data structure is generated by examining source and destination addresses associated with one or more packets.

6. The method as described in claim 1 further including updating the aggregate data structure.

7. The method as described in claim 6 wherein the aggregate data structure is updated one of: continuously, periodically, and on-demand.

8. Apparatus, comprising:

one or more processors;

computer memory holding computer program instructions executed by the processor processors to construct and use a protection scope for a virtual network by:

receiving a set of data structures, each such data structure having one or more entries, wherein each entry includes an address of a virtual resource in the virtual network that is to be protected, together with a reference to a packet inspection unit that is responsible to inspect packets associated with the virtual resource, each data structure having been generated in association with a packet inspection unit;

aggregating information from at least first and second of the data structures to generate an aggregate data structure, the aggregate data structure representing a current protection scope for the virtual network; and providing the aggregate data structure to each packet inspection unit;

at a given one of the packet inspection units, receiving a data packet, the data packet including source and destination address information;

determining, using the current protection scope and the source and destination address information, whether to inspect the data packet by the packet inspection engine; and based on the determination, taking a given action, the given action being one of: inspecting the data packet by the packet inspection engine, and bypassing inspection of the data packet.

9. The apparatus as described in claim 8 wherein the address of a virtual resource in the virtual network is a media access control (MAC) address.

10. The apparatus as described in claim 8 wherein the information from at least first and second data structures is aggregated by merging the first data structure with the second data structure to create the aggregate data structure.

11. The apparatus as described in claim 8 wherein a data structure is generated by examining source and destination addresses associated with one or more packets.

12. The apparatus as described in claim 8 wherein the computer program instructions also update the aggregate data structure.

13. The apparatus as described in claim 12 wherein the aggregate data structure is updated one of: continuously, periodically, and on-demand.

14. A computer program product in a non-transitory computer readable medium for use in a data processing system, the computer program product holding computer program instructions executed by the data processing system construct and use a protection scope for a virtual network by:

receiving a set of data structures, each such data structure having one or more entries, wherein each entry includes an address of a virtual resource in the virtual network that is to be protected, together with a reference to a packet inspection unit that is responsible to inspect packets associated with the virtual resource, each data structure having been generated in association with a packet inspection unit;

aggregating information from at least first and second of the data structures to generate an aggregate data structure, the aggregate data structure representing a current protection scope for the virtual network;

providing the aggregate data structure to each packet inspection unit;

at a given one of the packet inspection units, receiving a data packet, the data packet including source and destination address information;

determining, using the current protection scope and the source and destination address information, whether to inspect the data packet by the packet inspection engine; and based on the determination, taking a given action, the given action being one of: inspecting the data packet by the packet inspection engine, and bypassing inspection of the data packet.

15. The computer program product as described in claim 14 wherein the address of a virtual resource in the virtual network is a media access control (MAC) address.

16. The computer program product as described in claim 14 wherein the information from at least first and second data structures is aggregated by merging the first data structure with the second data structure to create the aggregate data structure.

17. The computer program product as described in claim 14 wherein a data structure is generated by examining source and destination addresses associated with one or more packets.

18. The computer program product as described in claim 14 wherein the computer program instructions also update the aggregate data structure.

19. The computer program product as described in claim 18 wherein the aggregate data structure is updated one of: continuously, periodically, and on-demand.

* * * * *